United States Patent Office 3,790,553
Patented Feb. 5, 1974

3,790,553
EXTRACTION PROCESS FOR PREPARATION OF VITAL WHEAT GLUTEN FROM WHOLE WHEAT KERNELS
Ganta V. Rao and Oliver B. Gerrish, Sr., Hutchinson, Kans., assignors to Far-Mar-Co., Inc.
No Drawing. Filed Sept. 25, 1972, Ser. No. 291,635
Int. Cl. A23j 1/12
U.S. Cl. 260—112 G
14 Claims

ABSTRACT OF THE DISCLOSURE

Gluten protein may be recovered from the whole wheat kernel according to a two-stage extraction process. The kernel is tempered to a moisture content, by weight, from about 15% to saturation, the tempered kernel is crushed, flaked or ground and the low molecular weight proteins are extracted from the crushed wheat in a water slurry having a wheat to water ratio, by weight, of 1:1 to 1:5 and a pH of 4.5–8.0. The high molecular weight proteins are extracted from the crushed wheat in a pH 9.0–12 slurry consisting of one part, by weight, water-extraction solid residue and from 1–5 parts, by weight, mild base, such as ammonium hydroxide.

BACKGROUND OF THE INVENTION

Field of the invention

The present invention relates to vital wheat gluten and, more particularly, to a process of extracting vital wheat gluten from the whole wheat kernel.

Description of the prior art

Vital wheat gluten is a proteinaceous material used in the food industry primarily as an ingredient in bakery products. Other representative uses include cereals, pasta products, dietary foods, and specialty products. These uses depend on the ability of gluten to hydrate rapidly into a cohesive elastic mass.

The commercial production of vital wheat gluten has been accomplished in the past using wheat flour or second clears as the starting material by the "dough ball" process and modifications thereof, which processes essentially separate the wheat starch from the gluten protein. In one process, the gluten is maintained as a single coherent mass and the starch is washed out of a flour and water dough. Another process disperses the dough in water and recovers the gluten particles on a screen. Variations of the basic "dough ball" process utilizing wheat flour account for all of the vital gluten produced commercially today.

Other type gluten production processes using wheat flour have been suggested. For example, U.S. Pat. 3,574,180 teaches a water-ammonium hydroxide single step extraction process for separating gluten protein from starch. However, such a process is inefficient and commercially impractical. No known gluten production process employs the whole wheat kernel as the starting material. This is probably because production of vital wheat gluten is a comparatively recent innovation which developed from starch recovery processes. Early starch recovery processes utilized the whole wheat kernel but could not be converted to gluten production because the process conditions were sufficiently harsh to destroy or devitalize the gluten. On the other hand, "dough ball" or batter processing was relatively simple because the gran and the germ had been substantially removed in the milling process. In addition, high ash clear flour worked well in the "dough ball" process and was available at attractive prices as a by-product of the flour milling industry. Consequently, wheat gluten processing has been flour oriented for decades and no need has apparently existed to motivate the development of a process starting from the whole wheat kernel.

However, improvements in milling techniques coupled with a drastic decline in the number of operative flour mills has led to current shortages of and higher prices for clears. In fact, millions of pounds of vital wheat gluten are imported by the United States each year to meet demands domestic producers cannot fill.

SUMMARY OF THE INVENTION

It is, therefore, an object of the present invention to provide a vital wheat gluten recovery process which utilizes the whole wheat kernel as the starting material.

It is another object of the present invention to provide a vital wheat gluten recovery extraction process which is more efficient in protein-starch separation than heretofore known processes.

It is still another object of this invention to provide an extraction process for separating gluten protein from starch which process is commercially feasible.

Other objects and advantages will become apparent from the following description and appended claims.

Briefly stated, in accordance with the aforesaid objects, the present invention provides a two-step extraction process for the separation of vital wheat gluten from the whole wheat kernel. The first step comprises tempering the whole wheat kernel to a moisture content, by weight, from about 15% to saturation, crushing, flaking or grinding the kernel, mixing the resulting wheat with water to form a slurry having a ratio by weight of wheat to water in the range of 1:1 to 1:5, adjusting the slurry pH to the range of 4.5–8.0, agitating the slurry vigorously and centrifuging same to obtain phase separation and separating the supernatant liquid from the solid residue. The supernatant liquid has dissolved therein the water soluble, low molecular weight proteins. According to the second step, the solid residue from the first step is slurried with a mild base, preferably ammonium hydroxide, at a ratio by weight of residue to base in the range of 1:1 to 1:5, the pH of the slurry is adjusted to 9.0–12, and the slurry is agitated vigorously and centrifuged to obtain phase separation, following which the supernatant liquid is separated from the residue. The supernatant contains the ammonia soluble, high molecular weight protein while the residue is essentially starch.

DETAILED DESCRIPTION OF THE INVENTION

The present process is directed primarily to the recovery of vital wheat gluten from the whole wheat kernel instead of from wheat flour, as is presently the practice. However, it will be appreciated that the process could also be practiced using wheat flour as the starting material by eliminating the tempering and crushing steps to be described in detail hereinafter. Aside from considerations of availability, there are a number of distinct advantages incident to starting from the whole wheat kernel. Essentially all of the gluten in the wheat is recoverable from the whole wheat kernel, while processing of wheat flour, by its nature, can recover only the gluten in the by-product clears. Moreover, the whole wheat kernel offers a stable supply of raw material with dependable and predictable physical and chemical characteristics. On the other hand, wheat flour is a by-product of differing milling techniques and is neither a uniform nor a stable raw material. In addition, processing the whole wheat kernel produces a greater yield of high quality gluten per bushel of wheat processed.

Selective separation of gluten from starch, and of low molecular weight protein from high molecular weight protein, is accomplished according to the present invention by a two-step extraction procedure which utilizes the differences in solubility of the respective proteins in water and in mild base solutions. The vitality of both the high and low molecular weight portions of the gluten recovered according to the process is preserved. Inasmuch as high molecular weight protein yields greater loaf volume and greater hinge strength, it is of more value to the baking industry than is low molecular weight protein. The separation effected by the present invention, based upon molecular weights, permits subsequent blending of high and low molecular weight components in any desired ratio and custom tailoring of the gluten characteristics.

The first step of the two-step extraction process comprises tempering the whole wheat kernel in water to achieve a moisture content thereof in the range, by weight, from about 15% to saturation and preferably from 20–22%. Unprocessed whole wheat kernels have a moisture content generally in the range from about 11.2 to 14%. The saturation moisture level depends upon the characteristics of the kernel and, at room temperature, is generally in the range from about 45% to 55%. Tempering in accordance with the present process involves immersing the kernels in water for a period of time sufficient to allow the kernels to take-up the necessary water to reach the desired moisture content. It is preferred, although not required, to temper the kernels in precisely the amount of water necessary to reach the desired water content. This avoids loss of water-soluble protein, particularly from the bran, which could remain in any leftover tempering water. Tempering is a relatively slow process, it having been found that immersion of the kernels in water at room temperature, i.e. about 30° C., requires about 12–24 hours to reach saturation. However, the tempering rate can be increased by heating. If the tempering solution is heated, care must be exercised to maintain the temperature below a value where the gluten may become damaged. Gluten damage will occur at about 140° F. or, after prolonged heating, at temperatures above 120° F.

Tempering the whole wheat kernel is necessary as a preliminary to the crushing and/or flaking step wherein the kernel is effectively reduced in particle size. Crushing or flaking may be accomplished in a conventional roller mill, having clearances from 0.001 to 0.05 inch. While the ultimate particle size resulting from the crushing or flaking is immaterial, it has been found that particles in the 10–100 mesh range may be satisfactorily processed in accordance with the present process. As used hereinafter and in the claims, the term "crushing" or "crushed wheat" refers to wheat which has been processed in commercially available equipment, such as roller mills, and which has been crushed, flaked or ground therein. Crushing or flaking is preferable to grinding because it has been found to be extremely difficult, as a practical matter, to subsequently remove the bran from ground wheat.

The crushed wheat is slurried with water and the pH of the slurry adjusted to range from 4.5 to 8.0, and preferably from 6.0–6.5. Depending upon the extent of tempering and the use of anti-microbial agents, such as ammonium hydroxide, during the tempering process, the pH of the slurry will vary and, therefore, the extent of, or need for, pH adjustment will likewise vary. The ratio by weight of crushed wheat to water in the slurry may vary over the range from 1:1 to 1:5. Preferably, the slurry is diluted with 2 parts water per part of crushed wheat.

At this point in the process it has been found to be convenient to screen the slurry, such as by using screens from 30–300 mesh, to remove the bran from the crushed wheat. During the crushing or flaking process, the bran maintains its physical integrity, at least to the extent of remaining as relatively large chunks. Thus, it is susceptible of ready removal by screening at this point in the process. Had the kernel been ground in lieu of crushing or flaking, it would be difficult to remove the small bran particles by a simple process such as screening. It will be appreciated that bran removal is necessary only to produce a more commercially palatable gluten product and its removal is by no means a necessary step in the protein extraction. Thus, screening is merely exemplary of the many known techniques which may be used to accomplish the bran removal.

The wheat-water slurry is thoroughly agitated and exposed to high shear forces in any high speed electric mixer for a period from 5 to 30 minutes, after which the slurry is centrifuged in conventional batch or continuous centrifugation apparatus until a distinct phase separation is observed. The time and speed of centrifugation is per se immaterial and depends on the characteristics of the wheat and the dilution of the slurry. Suffice it to say that the slurry should be centrifuged for a time and at a speed sufficient to effect a phase separation. The supernatant liquid resulting from the centrifugation is water containing dissolved water-soluble, low molecular weight protein. The protein may be recovered by separating the supernatant liquid from the solid residue and evaporating the liquid under vacuum at room temperature or by use of other suitable drying techniques.

The residue resulting from the centrifugaiton is next slurried with a mild base, such as ammonium hydroxide. Exemplary of other mild bases which would be suitable, although not commercially practical, are pyridine, triethylamine, methylamine, ethylamine, diethylamine, piperidine, cyclohexylamine, analinamine, and ethylenediamine. While strongly basic substances might be suitable for effecting the dissolution of the high molecular weight protein from the wheat, they will adversely affect the vitality of the gluten protein. On the other hand, a mild amine type base, such as ammonium hydroxide, has been found to be satisfactory. The slurry composition may have a residue to ammonium hydroxide proportion by weight in the range from 1:1 to 1:5, with the preferred dilution being 1–2 parts by weight residue to 2 parts by weight ammonium hydroxide. The pH of the slurry is adjusted to the range from 9.0 to 12.0 and preferably from 9.5–10.2.

To accomplish the extraction of the high molecular weight proteins from the wheat, the residue-ammonium hydroxide slurry is agitated vigorously in an electric mixer to expose the slurry to high shear forces, after which the slurry is centrifuged to effect a distinct phase separation. As in the water extraction step, agitation is continued from about 5 to 30 minutes as necessary and centrifugation is continued until phase separation is accomplished. The supernatant ammonium hydroxide solubles may be separated from the residual solid material and dried at room temperature in a vacuum oven or other suitable apparatus to recover the high molecular weight protein. The residual solid material is wheat starch, containing only a fractional percentage of protein. The starch may be air-dried at room temperature.

A typical analysis of the supernatant liquids obtained from each step of the two-stage extraction process shows that the water contains about 26–27° water soluble protein on a dry basis, the ammonium hydroxide contains about 70–75% ammonia-soluble protein on a dry basis and the residual starch contains only about 0.2% protein on a dry basis. It will be appreciated that protein recovery of this magnitude has never before been achieved by extraction.

As hereinbefore indicated, it was found that the pH of the ammonia slurry could be permitted to vary between about 9 and 12 and still obtain substantially better protein recovery than was obtainable with any known prior art extraction method. Below about 9.0 and above about 12.0, the efficiency of the process decreases considerably.

To demonstrate the important of pH in the ammonia extraction, the whole wheat kernel was tempered with water to achieve a moisture content in the range of 15% to saturation, the tempered flakes were crushed and a water slurry having proportions by weight of 1 part crushed wheat to 2 parts water at 25° C. and a pH of 5.7–6.7 was formed. The water slurry was agitated for 20 minutes following which it was centrifuged and the supernatant liquid containing the water soluble protein recovered. The residue was divided into a number of equal portions. Each portion was diluted with two parts by weight ammonium hydroxide per part of residue and the pH of each slurry portion was adjusted to the desired pH level with ammonium hydroxide additions. Following agitation and centrifugation, the supernatant was removed and the percent protein in the ammonia solubles determined. Maximum yields were obtained in the pH range from 9.5 to 10.2. Percent protein extractions in excess of 40% were noted throughout the range of pH 9.0 to 12.0.

A number of tests were also conducted to observe the effect of the wheat to extracting solvent ratio on the efficiency of the protein separation. In each case, the whole wheat kernel was tempered to a moisture content in the range from 15% to saturation, crushed in a roller mill, extracted first with water and then with ammonium hydroxide solution. Specifically, the crushed wheat was divided into a number of equal portions and each portion was slurried with differing amounts of water at a controlled pH in the range from 5.7–6.7. Following screening to remove the bran, agitation and centrifugation, the supernatant from each portion was poured off and analyzed for protein content. The residue from each portion was mixed with ammonium hydroxide to form a slurry at a controlled pH of 10.2. In each case, the residue was diluted with the same proportion of ammonium hydroxide as the crushed flake had been diluted with water. The ammonium hydroxide-residue slurries were agitated, centrifuged to achieve phase separation and the supernatant liquid was separated and analyzed. Table I sets forth representative wheat-extracting solvent ratios and the percent protein (dry basis) extracted by the water and the ammonium hydroxide for each ratio.

TABLE I

| Crushed wheat extracting solvent ratio | Percent protein (D.B.) | |
| --- | --- | --- |
| | Water extraction | Ammoniacal extraction |
| 1.0/1.5 | 29.0 | 44.1 |
| 1.0/2.0 | 27.8 | 67.9 |
| 1.0/5.0 | 22.3 | 46.7 |

It was noted that at wheat to solvent ratios below about 1:1, a dough formed instead of a slurry and the extraction was inefficient. Above a ratio of about 1:5, lower yields were obtained due to the gluten and tailing starch compacting on the prime starch.

Moisture content of the whole wheat kernel has been found to influence, a substantial extent, the protein recovery in both the water and ammonium hydroxide extractions. Specifically, it has been found that the water extraction step is most efficient at moisture levels approximating saturation. This is believed to be the case because at such high moisture contents there appears to be a prolonged intimate association between the water soluble protein and the moisture during the temperature period. The ammonia extraction, on the other hand, appears most efficient at moisture contents of about 22%. Since the protein yield from the ammonia extraction is significantly greater than from the water extraction, and considering tempering time to achieve the desired moisture content as a factor, the preferred moisture level in the wheat kernel is in the range from about 20–22%.

To illustrate the foregoing, the gluten from whole wheat was extracted according to the present process under uniform conditions except that the moisture content following varied considerably. Specifically, the wheat was tempered to the desired moisture content and then crushed, flaked or ground. The water extraction was accomplished from a pH 6.0–6.5 slurry having a crushed wheat to water ratio, by weight, of 1:2. The water slurry was agitated in an electric mixer for about 20 minutes after which it was centrifuged and the supernatant liquid recovered. The residue was slurried with 2 parts ammonium hydroxide per part residue and adjusted to a pH of 10–10.2. The ammonium hydroxide-residue slurry was agitated in an electric mixer for 5 minutes following which it was centrifuged and the supernatant was recovered.

The following results were obtained for wheat having the indicated moisture contents.

TABLE II

| | Percent protein (D.B.) | |
| --- | --- | --- |
| Moisture content | Water extraction | Ammoniacal extraction |
| 11.2 | 22.8 | 57.8 |
| 22.4 | 21.9 | 66.9 |
| 49.5 | 29.1 | 65.9 |

The following examples generally illustrate the practice of the present process:

EXAMPLE I

One thousand grams (1000 g.) of hard red winter wheat and one hundred fifty grams (150 g.) of water were mixed uniformly in any suitable mixer over a period of twenty minutes (20 min.) and left overnight to temper. The tempered wheat (moisture 22.5%) was crushed or flaked in a roller mill. Two hundred and fifty grams (250 g.) of crushed or flaked wheat was made a slurry in five hundred grams (500 g.) of water and most of the bran was removed by passing through a 30 mesh screen. The screened slurry was mixed in a high speed electric mixer for twenty five minutes (25 min.) and centrifuged until phase separation was observed. The supernatant aqueous phase was evaporated under vacuum and analyzed for protein content. The solid residue from centrifuging was mixed with five hundred grams (500 g.) of ammonium hydroxide solution at pH 10.2. The slurry was adjusted to pH 10.2 and subjected to high shear forces in an electric mixer for five minutes (5 min.). The slurry was centrifuged until phase separation was observed. The supernatant ammonia solubles were vacuum dried and analyzed for protein content. A material balance showed a total protein recovery of eighty one percent (81%) from the wheat kernel.

Analysis: (Dry Basis)
Gluten:
  (a) Percent protein (water solubles) _____ 26.8
  (b) Percent protein (ammonia solubles) ____ 73.6
Starch—Percent protein _____ 0.18

EXAMPLE II

The procedure set forth in Example I was followed. 500 g. of whole wheat was tempered overnight in 50 g. of water to attain a moisture content of 19.95%. The tempered wheat was crushed or flaked in a roller mill and 250 grams thereof was extracted first with water and then with ammonium hydroxide as set forth in Example I. The total protein recovery was 79% from the wheat kernel.

Analysis: (Dry Basis)
Gluten:
  (a) Percent protein (water solubles) _____ 24.1
  (b) Percent protein (ammonia solubles) _____ 70.9
Starch—Percent protein _____ 0.32

EXAMPLE III

The procedure set forth in Example I was followed. 500 g. of whole wheat was tempered overnight in 100 g. of water to attain a moisture content of 28.47%. The tempered wheat was crushed or flaked in a roller mill and 250 grams thereof was extracted first with water and then with ammonia hydroxide as set forth in Example I. The total protein recovery was 80% from the wheat kernel.

Analysis: (Dry Basis)

Gluten:
- (a) Percent protein (water solubles) _____ 29.0
- (b) Percent protein (ammonia solubles) ____ 69.9

Starch—Percent protein _____ 0.20

EXAMPLE IV

The procedure set forth in Example I was followed. 500 g. of whole wheat was tempered overnight in 175 g. of water to attain a moisture content of 37.7%. The tempered wheat was crushed or flaked in a roller mill and 250 grams thereof was extracted first with water and then with ammonium hydroxide as set forth in Example I. The total protein recovery was 81% from the wheat kernel.

Analysis: (Dry Basis)

Gluten:
- (a) Percent protein (water solubles) _____ 24.0
- (b) Percent protein (ammonia solubles) ____ 69.9

Starch—Percent protein _____ 0.19

EXAMPLE V

The procedure set forth in Example I was followed. 500 g. of whole wheat was steeped in 1000 g. of water for 24 to 40 hours to achieve a moisture content of 49.95%. The steeped wheat was crushed in a roller mill and 250 grams thereof was extracted first with water and then with ammonium hydroxide as set forth in Example I. The total protein recovery was 82% from the wheat kernel.

Analysis: (Dry Basis)

Gluten:
- (a) Percent protein (water solubles) _____ 24.2
- (b) Percent protein (ammonia solubles) ____ 72.6

Starch—Percent protein _____ 0.16

While the present invention has been described with respect to the particular embodiments thereof, it will be understood that numerous modifications may be made by those skilled in the art without actually departing from the scope of the invention. Accordingly, all modifications and equivalents may be resorted to which fall within the scope of the invention as claimed.

What is claimed as new is as follows:

1. A process for extracting protein from the whole wheat kernel comprising the steps of:
   - (a) tempering the wheat kernel in water to a moisture content, by weight, in the range from 15% to saturation;
   - (b) crushing the wheat kernel;
   - (c) forming a crushed wheat-water slurry having a pH in the range from 4.5 to 8.0 and having proportions, by weight, of crushed wheat to water in the range from 1:1 to 1:5;
   - (d) agitating said slurry;
   - (e) centrifuging said slurry to effect a separation between a solid fraction and a supernatant liquid fraction;
   - (f) separating said solid and water-soluble protein containing liquid fractions;
   - (g) forming a solid fraction-mild base slurry having a pH in the range from 9.0 to 12.0 and having proportions, by weight, of solid fraction to mild base in the range from 1:1 to 1:5;
   - (h) agitating said slurry;
   - (i) centrifuging said slurry to effect a separation between a solid fraction and a supernatant liquid fraction; and
   - (j) separating said solid and mild base soluble protein containing liquid fractions.

2. A process, as claimed in claim 1, wherein said mild base is ammonium hydroxide.

3. A process, as claimed in claim 1, wherein said wheat kernels are tempered to a moisture content of from 20 to 22% by weight.

4. A process, as claimed in claim 1, wherein the pH of said crushed wheat-water slurry is in the range from 6.0 to 6.5.

5. A process, as claimed in claim 1, wherein the proportion by weight of crushed wheat to water in said crushed wheat-water slurry is 1:2.

6. A process, as claimed in claim 1, wherein said slurries are vigorously agitated for from 5 to 30 minutes.

7. A process, as claimed in claim 1, wherein the pH of said solid fraction-mild base slurry is in the range from 9.5 to 10.2.

8. A process, as claimed in claim 7, wherein said mild base is ammonium hydroxide.

9. A process, as claimed in claim 1, wherein the proportion by weight of solid fraction to mild base in said solid fraction-mild base slurry is in the range from 1:2 to 2:2.

10. A process, as claimed in claim 1, including the additional step of drying said supernatant liquids to recover the protein therefrom.

11. A process, as claimed in claim 10, wherein said drying is accomplished by evaporating said liquid under vacuum.

12. A process, as claimed in claim 1, wherein said wheat kernels are crushed to a 10–100 mesh particle size.

13. A process, as claimed in claim 1, including the additional step of screening said crushed wheat-water slurry to remove the bran therefrom.

14. A process for extracting protein from the whole wheat kernel comprising the steps of:
   - (a) tempering the wheat kernel in water to a moisture content, by weight, in the range from 20 to 22%;
   - (b) crushing the wheat kernel to a particle size of from 10–100 mesh;
   - (c) forming a crushed wheat-water slurry having a pH in the range from 6.0 to 6.5 and having proportions, by weight, of crushed wheat to water in the range of 1:2;
   - (d) agitating said slurry;
   - (e) centrifuging said slurry to effect a separation between a solid fraction and a supernatant liquid fraction;
   - (f) separating said solid and water-soluble protein containing liquid fractions;
   - (g) forming a solid fraction-ammonium hydroxide slurry having a pH in the range from 9.5 to 10.2 and having proportions, by weight, of solid fraction to ammonium hydroxide in the range from 1:2 to 2:2;
   - (h) agitating said slurry;
   - (i) centrifuging said slurry to effect a separation between a solid fraction and a supernatant liquid fraction; and
   - (j) separating said solid and ammonium hydroxide soluble protein containing liquid fractions.

References Cited

UNITED STATES PATENTS

| | | | |
|---|---|---|---|
| 2,442,789 | 6/1948 | Walsh et al. | 260—112 G X |
| 2,530,823 | 11/1950 | Kilander et al. | 260—112 G X |
| 2,537,811 | 1/1951 | Boeckeler | 260—112 G |

HOWARD E. SCHAIN, Primary Examiner

U.S. Cl. X.R.

99—17